3,574,693
ALKYLTHIO SUBSTITUTED HYDROXYBENZOIC
ACIDS AND ORGANOTIN SALTS THEREOF
Charles H. Fuchsman, Cleveland Heights, and William H.
Meek, Northfield, Ohio, assignors to Ferro Corporation, Cleveland, Ohio
No Drawing. Continuation-in-part of application Ser. No.
768,878, Oct. 18, 1968. This application Oct. 24, 1969,
Ser. No. 869,358
Int. Cl. A01n 9/12; C07c 149/40; C07f 7/22
U.S. Cl. 260—429.7                             6 Claims

ABSTRACT OF THE DISCLOSURE

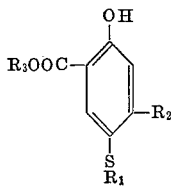

wherein $R_2$ is H or methyl, $R_1$ is an alkyl of from 1 to
12 carbon atoms, or aralkyl of from 7 to 12 carbon atoms,
$R_3$ is H or $Sn[(CH_2)_nH]_z$ wherein $z$ is an integer of
from 2 to 3 inclusive, $n$ is an integer of from 1 to 8 inclusive, and provided that both $R_2$ and $R_3$ are not both H.
The compounds are useful as bacteriostats and fungistats.

---

This application is a continuation-in-part of Ser. No.
768,878, filed Oct. 18, 1968.
This invention relates to alkyl thio-substituted hydroxybenzoic acids and their salts of the formula:

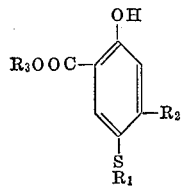

wherein $R_2$ is H or methyl, $R_1$ is an alkyl of from 1 to 12
carbon atoms or an aralkyl of from 7 to 12 carbon atoms,
$R_3$ is H or $Sn[(CH_2)_nH]_z$ wherein $z$ is an integer of from
2 to 3 inclusive, $n$ is an integer of from 1 to 8 inclusive,
and provided that both $R_2$ and $R_3$ are not both H.
Although the compounds of the invention are generally
useful as bacteriostats and fungistats, the dialkyltin salts
are particularly effective. Exemplary of suitable alkyl for
$R_1$ and $R_3$ in the above formula are methyl, ethyl, propyl,
butyl, pentyl, hexyl, heptyl, octyl, nonyl, decyl, lauryl
and isomers. Exemplary of suitable aralkyl are benzyl,
phenylethyl, phenylpropyl, phenylbutyl and phenylpentyl.
Exemplary of representative compounds of the invention
are the following:

5-(methylthio)-4-methylsalicylic acid
dibutyltin 5-(methylthio)-4-methylsalicylate
dibutyltin 5-(methylthio)-salicylate
dioctyltin 5-(methylthio)-4-methylsalicylate
dimethyltin 5-(methylthio)-4-methylsalicylate
tributyltin 5-(methylthio)-salicylate
dibutyltin 5-(methylthio)-salicylate
tributyltin 5-(methylthio)-4-methylsalicylate
5-(ethylthio)-4-methylsalicylic acid
5-(pentylthio)-4-methylsalicylic acid
5-(laurylthio)-4-methylsalicylic acid
5-(benzylthio)-4-methylsalicylic acid The novel acids of the invention can be prepared by
reacting a 3,4-disubstituted phenol with a suitable base,
preferably in the presence of a solvent, to form a phenoxide ion and then carboxylating the phenoxide ion by reaction with carbon dioxide preferably in the presence of an
amide solvent and finally acidifying the product to form
the hydroxy benzoic acid of the formula:

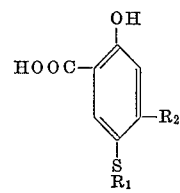

Exemplary of suitable amide solvents are the N,N-dialkyl
amides of from 2 to 10 carbon atoms. Exemplary of suitable bases are the alkali metal hydroxides, alkali metal
alkoxides and magnesium alkoxides. Exemplary of suitable N,N-dialkyl amides are dimethylformamide, dimethylacetamide and dimethylpropionamide. Exemplary of
suitable alkali metal hydroxides are potassium hydroxide
and sodium hydroxide. Exemplary of suitable alkali metal
alkoxides are sodium methoxide and potassium methoxide.
Exemplary of suitable solvents are the aromatic solvents
such as toluene and benzene. Alternatively an excess of
alkyl amide can be employed as a solvent.

The novel alkyl tin salts of the invention can be prepared by several procedures. Most convenient is the reaction of the aforesaid substituted hydroxybenzoic acid with
an alkyl tin chloride according to the following reaction
diagram wherein $R_1$, $R_2$, $R_3$ and $z$ are as previously
defined.

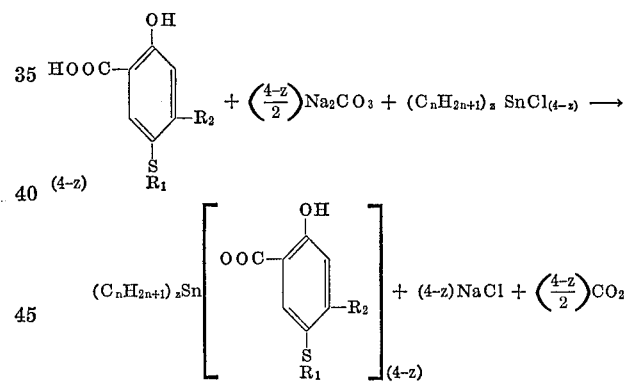

The reaction is preferably conducted in the presence of
an aromatic solvent such as benzene or toluene or other
relative inert solvent such as tetrachloroethane and the
like; and preferably in the presence of a base to neutralize
the hydrogen chloride by-product. Exemplary of suitable
bases are the alkali metal carbonates such as sodium and
potassium carbonate.

The following examples will serve to illustrate the invention and its preferred embodiments. Unless otherwise
indicated, all parts and percentages in said examples are
by weight.

EXAMPLE 1

Into a 500 ml. flask fitted with a thermometer, stirrer
and reflux condenser with Dean-Stark trap were added
30.8 grams (0.2 mole) of 4-(methylthio)-m-cresol and
12.5 grams (0.2 mole) of 90% potassium hydroxide dissolved in 100 ml. of toluene. The mixture was heated to
reflux temperature and maintained at that temperature
until all of the water of reaction was removed. Then 100
ml. of dimethylformamide was added to the mixture and
the toluene was distilled off at a temperature of 140° C.
Carbon dioxide was then bubbled through the mixture
and distillation of solvents was continued to a temperature of 160° C. The mixture was maintained at this temperature for two hours while carbon dioxide was continuously added. The reaction mixture was then allowed to cool, dissolved in 200 ml. of water and acidified with hydrochloric acid. The product was recrystallized from aqueous methanol to recover 22.8 grams (57.5% of theory) of 5-methylthio-4-methylsalicylic acid in the form of white crystals having an M.P. of 159–62° C. The following analysis of the product was obtained. percent C, calc., 54.55, found, 54.61; percent H, calc., 5.05, found, 5.11; percent S, calc., 16.15, found, 16.37.

EXAMPLE 2

In accordance with the procedure of Example 1, 28 grams (0.2 mole) of 4-methylthio)-phenol was substituted for 4-(methylthio)-m-cresol and the reaction repeated. The product was recrystallized from aqueous methanol to recover 22.3 grams (60.5% of theory) of a white crystalline product having a melting point of 126–9° C. The product was confirmed by infrared spectra to be 5-(methylthio)-salicylic acid having the following analysis. A.V., calc. 305, found 307; percent C, calc., 52.50; found, 52.27; percent H, calc., 4.35; found 4.54; percent S, calc., 17.35, found, 17.50.

EXAMPLE 3

12.48 grams of (0.06 mole+5%) of the product of Example 1 was reacted with 9.12 grams (0.03 mole) of dibutyltin dichloride in 100 ml. of benzene and 3.5 grams of sodium carbonate at a temperature of 80–85° C. for two hours. The mixture was then allowed to cool, the sodium chloride by-product removed by filtration and the toluene solvent removed by distillation to recover dibutyltin 5-(methylthio)-4-methylsalicylate as an off-white soft solid and the following analysis. Percent Sn: calc., 18.9, found 18.22.

EXAMPLE 4

In accordance with the procedure of Example 3, the acid of Example 2 was reacted with dibutyltin dichloride in the presence of $Na_2CO_3$ and toluene. The product dibutyltin 5-(methylthio)-salicylate was recovered as a soft pale yellow solid and the following analysis. Percent Sn: calc. 19.84, found 20.84.

EXAMPLE 5

In accordance with the procedure of Example 3, one mole of acid of Example 1 was reacted with 1 mole of tributyltin chloride to produce tributyltin 5-(methylthio)-4-methylsalicylate a liquid having the following analysis. 24.28% Sn (found), 24.4% (calc.).

EXAMPLE 6

In accordance with the procedure of Example 4, one mole of the acid of Example 2 was reacted with one mole of tributyltin chloride to produce tributyltin 5-(methylthio)-salicylate, a pale brown liquid having the following analysis. Percent Sn, 26.51 (found), 25.05 (calc.).

In order to test for their effect on bacteria the compounds of the invention are incorporated in nutrient agar to various dilutions. Stock solutions of 1% are prepared in isopropyl alcohol. The bacteria cultures are streaked over the surface of the agar. The bacterial plates are incubated at 37° C. for 48 hours and then observed for the presence of growth or no growth. The minimum inhibitory concentration expressed in parts per million is given for the examples of the invention in the following table against the test species Staphylococcus aureus (S.a.), Escherichia coli (E.c.) and a mixed fungi culture (F) composed of Aspergillus niger, Penicillium citrinum and Streptomyces rubrireticuli. The compounds are tested for inhibition against fungi by streaking the aforesaid species over the surface of a Sabouraud agar medium and the fungus plates incubated at 27° C. for 7 to 14 days. The plates are then observed for evidence of growth.

| Name of compound | Test species | | |
|---|---|---|---|
| | S.a. | E.c. | F |
| 5-(methylthio)-salicylic acid | 200 | 1,000 | 1,000 |
| Dibutyltin 5-(methylthio)-4-methylsalicylate | 10 | 50 | 100 |
| Dibutyltin 5-(methylthio)-salicylate | 10 | 50 | 100 |
| Tributyltin 5-(methylthio)-salicylate | 2 | 200 | 10 |
| Tributyltin 4-methyl-5-(methylthio)-salicylate | 1 | | 5 |

The organotin salts of 4-alkyl-5-(alkylthio)-salicylic acids are effective bacteriostats and fungistats. In this respect they depart markedly and unpredictably from the behavior of dibutyltin salts of other ortho-hydroxycarboxylic acids, e.g., 3,5-ditert.-butyl-2,6-dihydroxybenzoic acid (DBRA). A comparison of that acid and its dibutyltin salt is useful as a point of reference.

| | S | E | F |
|---|---|---|---|
| DBRA | 20 | 200 | 200 |
| Dibutyltin salt of DBRA | 20 | 1,000 | 200 |
| 5-(methylthio)-salicylic acid (X) | 200 | 1,000 | 1,000 |
| Dibutyltin salt of (X) | 10 | 50 | 100 |
| Tributyltin salt of (X) | 2 | 200 | 10 |
| 4-methyl-5-(methylthio)-salicylic acid (Y) | 1,000 | 1,000 | 1,000 |
| Dibutyltin salt of (Y) | 10 | 50 | 100 |

Legend: S=*Staphylococcus aureus* in nutrient agar; E=*Escherichia coli* in nutrient agar; F=Mixed fungus (*Aspergillus niger, Penicillium citrinum, Streptomyces rubrireticuli*) in Sabouraud agar.
All numbers are minimum inhibitory concentration in p.p.m.

It may be noted that while in the case of DBRA the conversion of the acid to the dibutyltin salt produced no improvement in inhibitory efficacy against Staphylococcus and an actual loss in efficacy against *Escherichia coli*, the corresponding conversion for 4-methyl-5-(methylthio)-salicylic acid produced a 100-hold improvement in effectiveness against Staphylococcus, and a 20-fold improvement against *E. coli*, and an improvement of better than 10-fold against fungi. The relative improvements by converting the 5-(methylthio)-salicylic acid to a dibutyltin salt were great, though not quite as great as those with the 4-methyl-5-(methylthio)-salicylic acid.

The tributylthin salt of 5-(methylthio)-salicylic acid is also effective.

It should be noted that the simple act of carboxylation of the 4-(methylthio)-phenol, or of 3-methyl-4-(methylthio)-phenol to produce (alkylthio)-salicylic acids does not per se impart improved anti-microbial properties.

| | S | E | F |
|---|---|---|---|
| 3-methyl-4-(methylthio)-phenol | 200 | 1,000 | 1,000 |
| 4-methyl-5-(methylthio)-salicylic acid | 1,000 | 1,000 | 1,000 |

The effect of the carboxylation is to provide the active group for attachment of the organotin moiety, which then co-acts with the rest of the molecule to exert its anti-microbial effects.

What is claimed is:
1. Compounds of the formula:

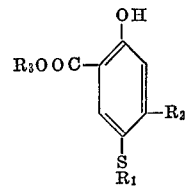

wherein $R_2$ is H or methyl, $R_1$ is alkyl of from 1 to 12 carbon atoms or aralkyl of from 7 to 12 carbon atoms, $R_3$ is H or $Sn[(CH_2)_nH]_z$ wherein $z$ is an integer of from 2 to 3 inclusive, $n$ is an integer of from 1 to 8 inclusive, and provided that both $R_2$ and $R_3$ are not both H.

2. A compound of claim 1 namely 5-(methylthio)-4-methylsalicylic acid.

3. A compound of claim 1 namely dibutyltin 5-(methylthio)-4-methylsalicylate.

4. A compound of claim 1 namely dibutyltin 5-(methylthio)-salicylate.

5. A compound of claim 1 namely tributyltin 5-(methylthio)-4-methylsalicylate.

6. A compound of claim 1 namely tributyltin 5-(methylthio)-salicylate.

References Cited

UNITED STATES PATENTS

| | | | |
|---|---|---|---|
| 1,841,622 | 1/1932 | Mendoza | 260—516X |
| 1,841,636 | 1/1932 | Saunders et al. | 260—516X |
| 2,977,379 | 3/1961 | Dorfelt et al. | 260—429.7 |
| 3,105,090 | 9/1963 | Leonard | 260—516X |
| 3,201,432 | 8/1965 | Leebrick | 260—429.7 |
| 3,431,306 | 3/1969 | Head et al. | 260—516 |

JAMES E. POER, Primary Examiner

W. F. W. BELLAMY, Assistant Examiner

U.S. Cl. X.R.

260—516; 424—288